United States Patent

Pyötsiä et al.

Patent Number: 5,992,229
Date of Patent: *Nov. 30, 1999

[54] METHOD AND EQUIPMENT FOR DETERMINING THE PERFORMANCE OF CONTROL VALVE

[75] Inventors: Jouni Pyötsiä, Helsinki; Esko Ylikoski, Kerava, both of Finland

[73] Assignee: Neles-Jamesbury OY, Helsinki, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/596,634

[22] Filed: Feb. 5, 1996

[51] Int. Cl.⁶ .................................... G01M 19/00
[52] U.S. Cl. .................. 73/168; 364/528.17; 702/113
[58] Field of Search ................. 73/168; 364/528.17; 702/45, 113, 114, 33

[56] References Cited

U.S. PATENT DOCUMENTS

| | | | |
|---|---|---|---|
| 3,665,945 | 5/1972 | Ottenstein | 364/528.17 |
| 4,294,109 | 10/1981 | Peters et al. | 73/168 |
| 4,417,312 | 11/1983 | Cronin et al. | 364/528.17 |
| 4,831,873 | 5/1989 | Charbonneau et al. | 73/168 |
| 4,869,102 | 9/1989 | Hale et al. | 73/168 |
| 4,888,996 | 12/1989 | Rak et al. | 73/168 |
| 4,891,975 | 1/1990 | Charbonneau et al. | 73/168 |
| 5,000,040 | 3/1991 | Charbonneau et al. | 73/168 |
| 5,174,152 | 12/1992 | Wohld | 73/168 |
| 5,272,647 | 12/1993 | Hayes | 702/45 |
| 5,337,262 | 8/1994 | Luthi et al. | 73/168 |
| 5,402,367 | 3/1995 | Sullivan et al. | 364/578 |
| 5,433,245 | 7/1995 | Prather et al. | 73/168 |
| 5,469,737 | 11/1995 | Smith et al. | 73/168 |
| 5,548,997 | 8/1996 | Bauer | 73/168 |
| 5,687,098 | 11/1997 | Grumstrup et al. | 73/168 |

FOREIGN PATENT DOCUMENTS

| | | |
|---|---|---|
| 0 315 391 | 10/1988 | European Pat. Off. . |
| WO 95/06276 | 3/1995 | European Pat. Off. . |

OTHER PUBLICATIONS

A Mathematical Model of a Control Valve, Jouni Pyotsia, 1991.

Nilsson B.; "Object–Oriented Chemical Process Modelling in Omola" IEEE Symposium on Computer–Aided Control System Design, Mar. 17, 1992, pp. 165–172 XP00061616816.

*Primary Examiner*—Andrew Hirshfeld
*Attorney, Agent, or Firm*—Pillsbury Madison & Sutro LLP

[57] ABSTRACT

A method for determining the performance of a control valve in a closed control loop by using a simulation model. A simulation model of a process control loop is provided, consisting of a unit process (2) including the flow equations of the valve, a process controller (4) and a process transmitter (3), to simulate a process with disturbances (6, 6'). The simulation model is connected to a real control valve (1), including a valve, an actuator and a positioner. The valve response is measured. The process variability during the process is determined.

7 Claims, 3 Drawing Sheets

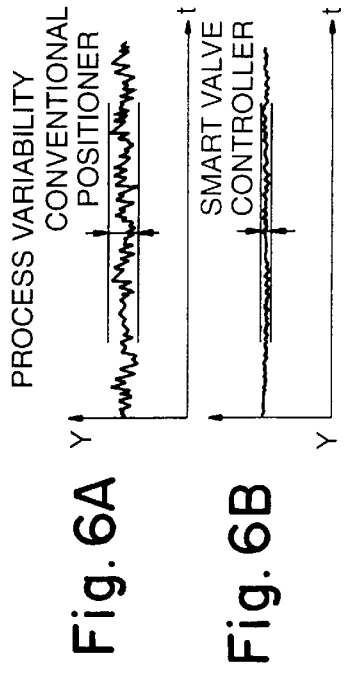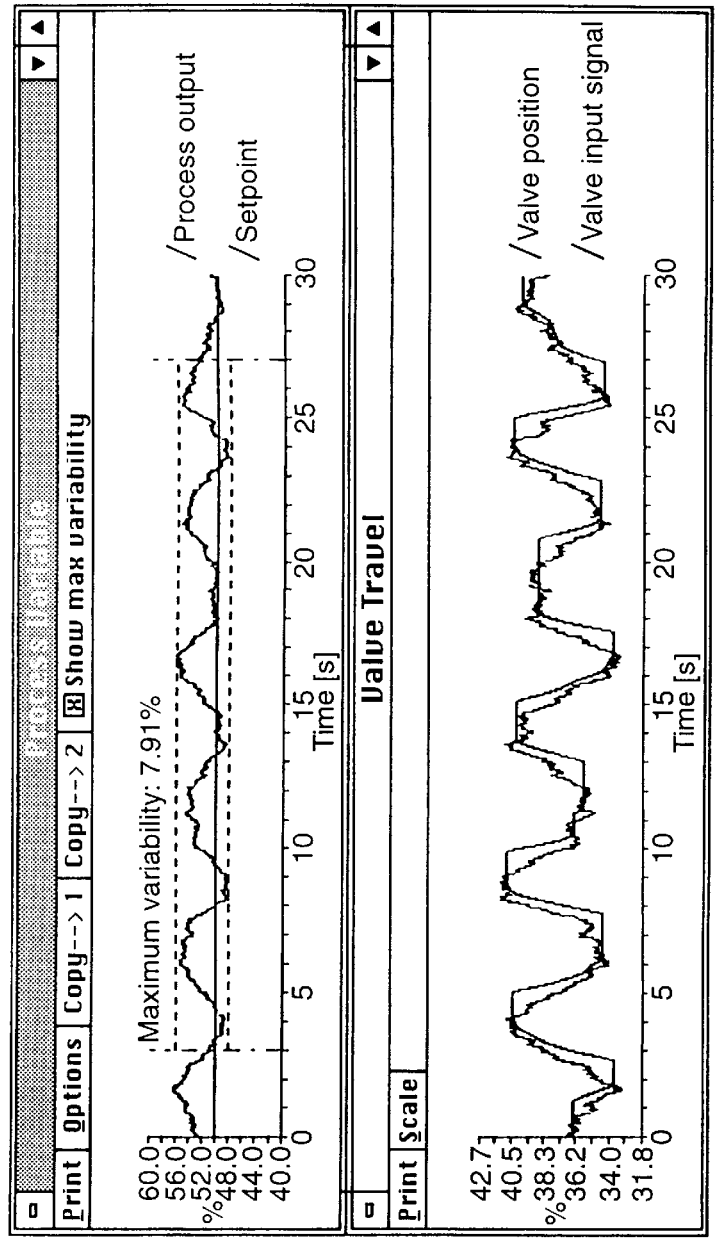
Fig. 6A
Fig. 6B
Fig. 7A
Fig. 7B

METHOD AND EQUIPMENT FOR DETERMINING THE PERFORMANCE OF CONTROL VALVE

FIELD OF THE INVENTION

This invention relates to a method for determining the performance of a control valve in a closed control loop by using a simulation model. The invention also relates to equipment for testing a control valve.

BACKGROUND OF THE INVENTION

A control valve and its operation is known and need not be described here in detail. A quarter turn valve can be for instance a ball valve or a butterfly valve. Examples of a ball valve are disclosed for instance in U.S. Pat. No. 4,747,578. A control valve is actuated by means of an actuator which moves the stem of the closure member between open and closed positions. An actuator can be operated by means of a cylinder-piston device which in turn is regulated by means of a valve positioner which operates the actuator in response to a control signal.

Control valves are often the most critical components in a control loop.

Control performance of an installed control valve depends primarily on the performance of the control valve but also on process conditions. There are three important factors which have to be taken into account in checking control preformance of an installed valve. They are Installed flow characteristics and installed gain Static behaviour of a control valve Dynamic behaviour of a control valve In analyzing loop performance it must be checked that the valve, actuator and positioner are correctly sized and selected. The best performance is usually achieved by a double acting actuator and a two-stage electropneumatic positioner. Double acting actuators are stiffer than spring return actuators because of the higher actuator pressure level. Therefore, they are less sensitive to disturbances, like dynamic torque or force, and they also give a fast valve response. It is important that the I/P (current to pressure) conversion of an electropneumatic positioner is inside the position feedback loop to compensate the errors by the feedback mechanism.

Control valves are often oversized because all the process data are not available and safety margins are used. If a valve is oversized, only a small part of the control range is in use. Many process controllers still have 10 bit D/A converters, which means about 0.1% resolution for the control signal. The theoretical resolution of input signal is, for example, 0.5% if only one fifth of the full control range is used.

Oversizing means poor control accuracy. For example, if the valve is oversized, then the control valve maximum relative installed gain is about 4 in a typical liquid flow application, and if at the same time, absolute position error in valve travel is 0.5%, then the maximum error in flow is 2.0%.

The control valve installed flow characteristics and gain affect also strongly control valve dynamics and dead time. If the gain varies strongly within the process operating range, also the operating speed of the control loop varies strongly. Control valve oversizing increases control loop dead time. Gain of an oversized valve is high whereby the controller gain must be reduced to prevent control loop instability. This means that the control valve input signal changes coming from process controller are smaller, which leads to strong increase in control valve dead time. This is a significant drawback in process variability.

Static behaviour of a control valve can be described with many different factors, such as Dead band Hysteresis plus dead band Repeatability Conformity/Linearity The first two are the most commonly measured nonlinearities of a control valve. They are mainly caused by a backlash and a high actuator load of the valve. Backlash can be removed only by valve maintenance. An actuator load can be decreased by reducing static friction and selecting a large enough actuator.

Repeatability and linearity of a control valve are usually adequate, because control loops are closed by feedback.

Dynamic perfomance of a control valve can be defined, for example, with the following factors Dead time Time constant(s)

Overshooting

Settling time

Stiction

The first four factors can be measured from a step response curve. Results depend a lot on the step size and the valve initial position, because dynamics of a control valve are strongly nonlinear.

Analyzing methods and rules that are based on the linear control theory do not apply well to control valves. A frequency response is rarely used. The methods of frequency analysis are defined mainly for linear systems.

Generally, control valves have to be tested in many operating points.

U.S. Pat. No. 5,249,117 discloses a control system where an estimator is used to generate a simulation of a process according to the information it receives relating to the status of a real process. Other publications relating to valve control systems are U.S. Pat. Nos. 5,109,692 and 5,261,437 and Finnish patent publication 53047. Different methods and systems for estimating process parameters are disclosed in U.S. Pat. Nos. 5,172,312, 4,674,028, 5,195,026, 5,267,139 and 5,357,424.

Process variability represents the quality of the process output of the controlling system. It can be defined in several ways, such as the maximum variability (difference between the maximum value and the minimum value within a certain measurement range); Integrated Error (IE); Integrated Absolute Error (IAE); etc.

The reasons for a high process variability are not easy to find without extra measurements. Poor process control can be caused, for example, by Lack of control valve maintenance Poor control valve sizing and selection Poor tuning of the process controller Poor process measurements Big disturbances Process variability is usually measured from sampled process values that are filtered from the real output of a process transmitter.

There are different criteria for analyzing the process variability. The easiest method is to measure the maximum variability of the process output signal. The second way is to calculate the control error area or an area factor between the setpoint and measured variable in a certain time scale. There are many well known integration methods in the control literature, for example ITAE, ITE, ITSE and ISTE. The third way to analyze process variability is to use more complicated signal processing methods.

It is usually difficult to estimate the influence of the control valve performance on the process variability. Flow control and tank level control loops have different sensitivity for control valve nonlinearities. In some cases, dead time is more significant than dead band, and vice versa.

Advances in control algorithms and measurements have been strong and give new possibilities to enhance control valve performance and testing. New smart control valves offer excellent chances to reach higher control performance.

SUMMARY OF THE INVENTION

The object of the present invention is to provide a method for analyzing an installed control valve performance and for selecting a suitable control valve or control valve tuning for a process so that the process variability can be minimized when it is controlled by the valve.

The method of the present invention is characterized in
  providing a simulation model of a process control loop, consisting of a unit process including the flow equations of the valve, a process controller and a process transmitter, to simulate a process with disturbances;
  connecting the simulation model to a real control valve, including a valve, an actuator and a positioner;
  supplying actuating energy to the positioner;
  measuring the valve response; and
  determining the process variability during the process.

The equipment according to the present invention is characterized in that it comprises:
  a control valve, including a valve, an actuator, a positioner and means for supplying actuating energy;
  a computer with an I/O card; and
  a closed control loop simulator for simulating a unit process, a process controller and a process transmitter.

The method of the present invention helps to determine control performance of a control valve with respect to process variability. It is applied in analyzing the control valve nonlinearities and dynamics in a process control loop. The method also helps to define the most critical nonlinearities when the process loop is known.

Control valve performance has a strong influence on process variability. This control performance has to be known in optimizing the loop performance.

It is important to find and study the critical control loops. Oversized valves and lack of valve maintenance are the most common reasons for poor control performance. The solution to these problems is the process variability testing system used in the method of the present invention.

In the system, a real control valve is connected to a simulated control loop consisting of a process controller, unit process and transmitter. The simulation models are selected from a model library.

The system helps in analyzing the installed control valve performance in a process control loop. The process variability testing system estimates the control valve performance with the help of only one parameter: process variability.

The main advantage of the system is the clear view of control valve performance and condition in a certain control loop. The meanings of conventional tests like dead band, dead time, hysteresis, speed of response, repeatability, linearity etc. on loop performance are not well defined. In fact, the system makes the tests and use of these factors unnecessary.

In the method of the present invention, the parameters of a closed control loop are defined in a case of a known control valve by modelling the process and other members of the closed control loop except the control valve.

A control valve includes so many nonlinearities that it is not feasible to reliably model each valve of different types and sizes. Because of that, a real valve is used when defining the parameters. The algorithms of the models and the I/O card of the computer can be made so fast that the controlling process will be in real time.

The process variability testing system is a tool for evaluating the loop performance without a real process.

Because loop performance can be tested without any real process, it means that the control loop performance can be estimated even before the installation of the valve. It is difficult to know beforehand without simulations or measurements how critical component the control valve actually is in a certain process application.

The conventional tests, like dead band test and the speed of response test, are not adequate in analyzing the performance of an installed control valve, especially when the control loop usually is closed. The process variability testing system simulates the closed process loop with a real control valve and it gives easy-to-use acceptance criteria to different applications.

Control valve performance has a strong influence on process variability. However, the quality of control valve performance is not easy to determine with conventional static and dynamic tests. Factors like installed flow characteristic and gain cannot be taken into account with the conventional tests. The new process variability testing system eliminates these drawbacks.

The main advantage of the new testing system is simplicity because it estimates the control valve performance with the help of only one of the most critical parameters: process variability. The clear view of installed control valve performance and condition in certain control loops together with an easy-to-use graphic user interface offer advantages beyond the existing systems.

The process variability testing system is an effective analyzing tool in control valve maintenance and selection. With the help of the new system, it is also easy to set acceptance criteria for different applications.

BRIEF DESCRIPTION OF THE DRAWINGS

The invention is described in detail in the following, with reference to the enclosed drawings in which FIG. 6 is a process variability comparison between a conventional positioner and a smart valve controller, and FIG. 7 shows an example of a simulation of a flow control loop and of the test results obtained.

DETAILED DESCRIPTION OF THE INVENTION

Figure 1:
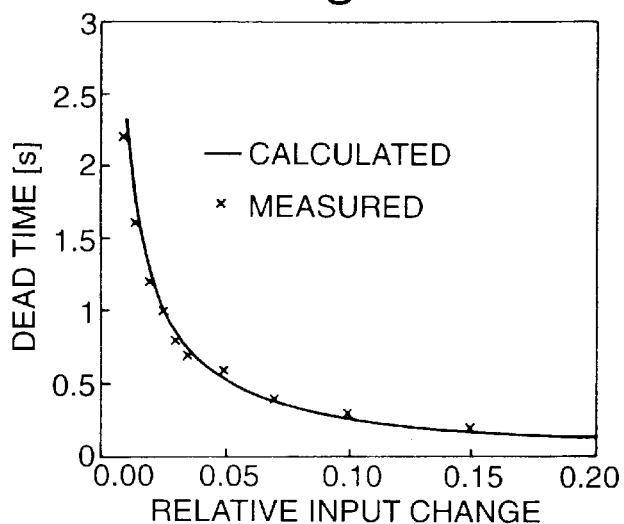
FIG. 1 shows graphically the relation between relative input change and dead time.

As pointed out in the above, small control valve input changes coming from process controller lead to strong increase in control valve dead time. The curve in FIG. 1 shows the calculated dead time in seconds as a function of relative input change, and points x show the measured values. It can be seen that small relative input signal changes lead to dramatically longer dead times.

Figure 2:
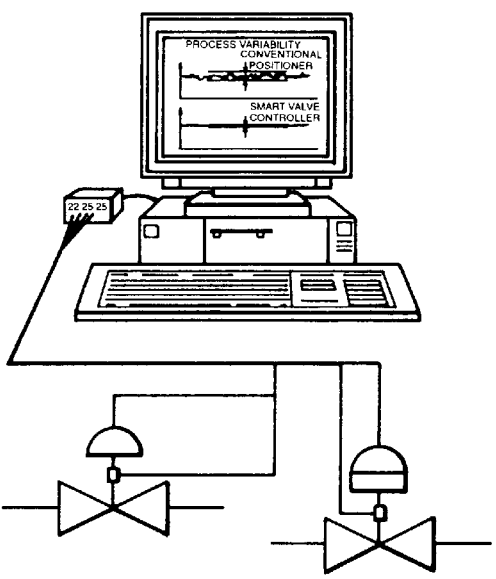
FIG. 2 shows the testing equipment according to the invention.

The system used in the present invention is based on a personnal computer testing system, real control valve and control loop simulator. The computer controls a real control valve and measures the valve response, as shown in FIG. 2. Only the position of the valve is measured. The system simulates a simple unit process, a process controller, a process transmitter and disturbances. The inherent flow characteristic of the valve and the pipeline behaviour are also modelled in the system.

There are different unit process models, such as tank level loops, flow control loops, pressure control loops, temperature control loops and blending loops, in a model library. An operator can compare different process controllers and tuning. Disturbances and noise of the measured signals can be set by the operator.

The mathematical models can be linear or nonlinear, and for the process, partial process or for measuring sensors. The linear models can be for instance differential equation models or models represented by means of transfer functions. The nonlinear models can be for instance differential equation models where the nonlinearities of the process or measuring sensors have been taken into account.

Figure 3:
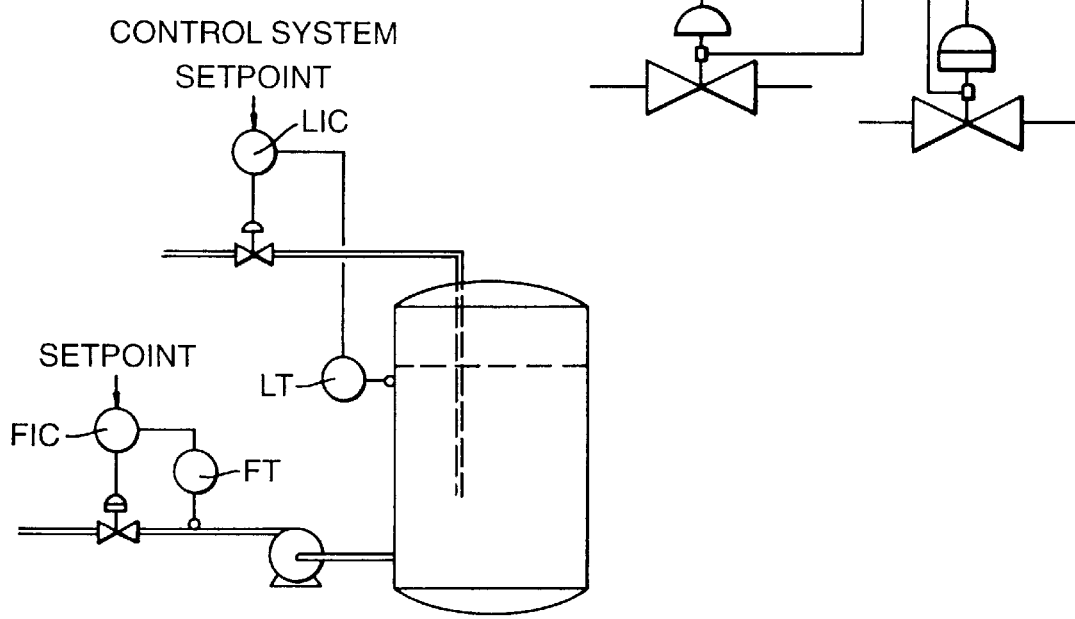
FIG. 3 shows schematically a unit process.

The operator can study the process loop in many ways. First, the system shows how the selected process loop looks like. FIG. 3 shows a simple description of a unit process. The control loops are presented as schematic drawings. The intent of this level is to describe the control loop structure and the field devices.

Figure 4:
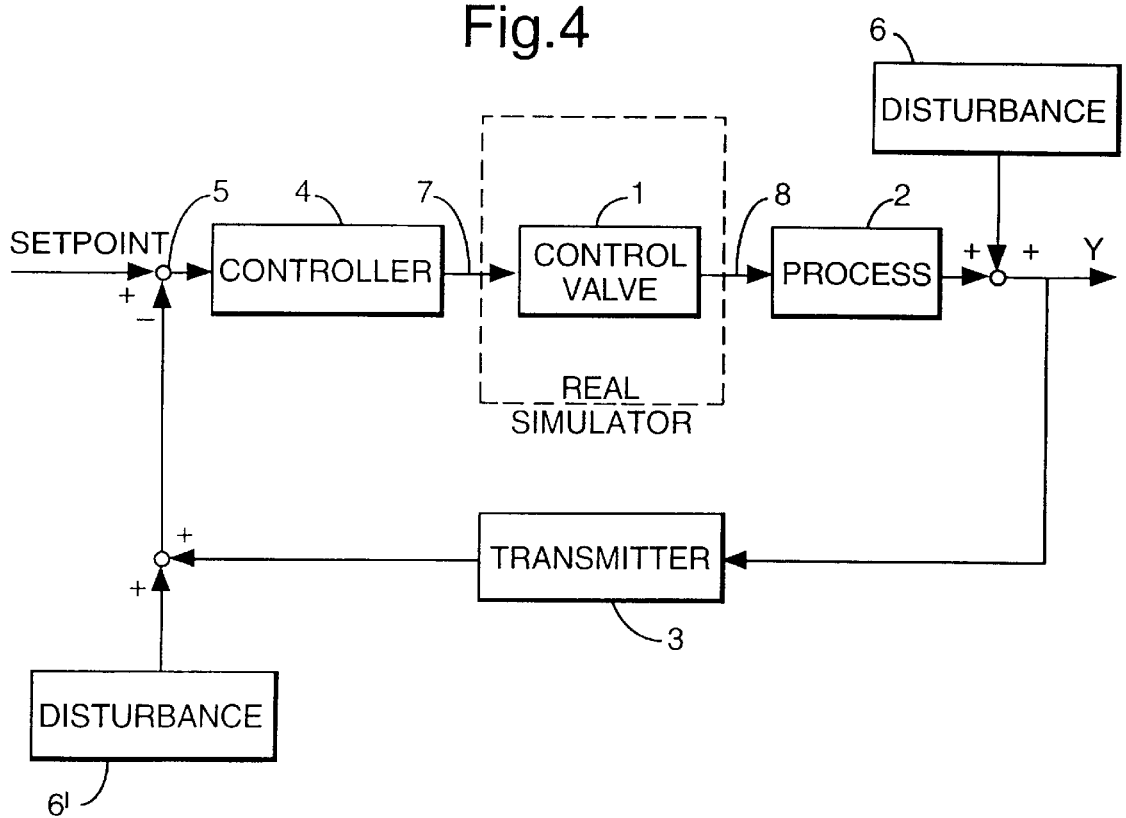
FIG. 4 is a block diagram of a control loop used in the method of the present invention.

The second level presents the block diagram for the loop, see FIG. 4. It defines the loop connections and shows what part of the loop is simulated and what are the real measurements. Also, the parameter configuration of the simulation model is made on this level.

In FIG. 4, the real area is the one within the broken line, that is only the control valve 1, including a valve, an actuator and a positioner. The position of the valve is measured, and it is used in a mathematical model of the valve in process. Because the valve position is the only thing measured, the testing unit can be kept simple.

The area outside the broken line is simulated. The simulated section includes process 2, transmitter 3, setpoint 5 and controller 4. Disturbances 6, 6' can be created both before the transmitter and between the transmitter and the controller, and the valve response is measured. If the response is not acceptable, another valve can be selected, or the gain of the positioner can be changed, for instance. In this way, a suitable control valve for a certain process can be found. The valve receives valve input signal 7, and the valve position 8 is used in the simulation model.

An important factor when determining the process variability is the disturbances used. It is possible to use a certain general disturbance characteristic to the control loop as a standard test disturbance. However, it is also possible to specify other disturbances or they can be measured from a real control loop in question.

Figure 5:
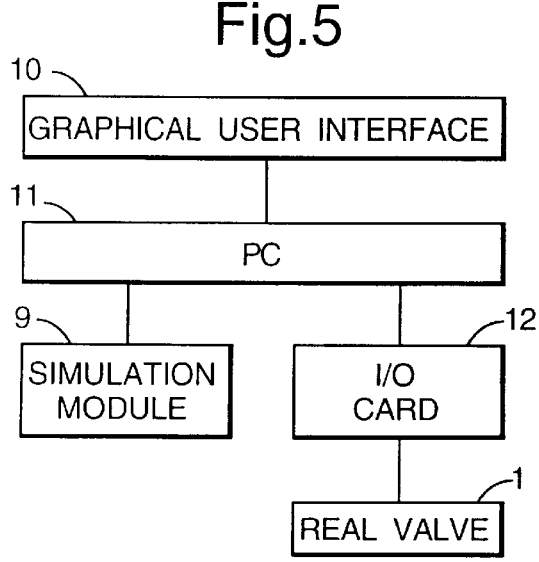
FIG. 5 shows the system structure used in the method of the present invention.

FIG. 5 shows the system structure used in the equipment of the present invention. A simulation module 9 and a graphical user interface 10 are connected to the personal computer 11. A real valve 1 is connected to the PC via an I/O card 12. An I/O card is an input/output device, a unit that accepts new data and sends it into the computer for processing, receives the results and translates them into a usable form for the positioner.

The third level is the process variability window. It shows simulation results of the system, see FIG. 6. In FIG. 6, the upper graph shows the process variability when a conventional positioner is used, and the lower graph shows the same when a smart valve controller is used.

FIG. 7 is an example of the simulation of a flow control loop and the test results obtained. The essential feature in the test results is the simple output, that is the value for the process variability. In this case it is the maximum variability at a defined testing time range. Other ways of showing the process variability are for instance Integrated Error, Integrated Absolute Error, etc.

We claim:

1. A method for determining the performance of a control valve assembly in a closed control loop, said method comprising:
   a) selecting a mathematical part of a simulation model of a process control loop, the model including a process variable, flow equations for the control valve and pipeline behavior features, a process controller, and a process transmitter;
   b) connecting the mathematical part of the simulation model to the control valve assembly having a control valve, an actuator and a positioner;
   c) supplying actuating energy to the positioner;
   d) measuring the valve position;
   e) simulating a process control loop with disturbances; and
   f) determining the process variability during the process, wherein the performance of the control valve assembly is evaluated as the process variability.

2. A method according to claim 1, said method further comprising: providing a model library from which the simulation model is selected.

3. A method according to claim 2, wherein the model library includes models of at least some of the following models: flow control loops, pressure control loops, temperature control loops, tank level control loops and blending loops.

4. A method according to claim 1, wherein a general disturbance characteristic to the control loop is used as the disturbances in the simulated process control loop.

5. A method according to claim 1, wherein disturbances measured from a real process control loop are used as the disturbances in the simulated process control loop.

6. Equipment for testing a control valve assembly, said equipment comprising:
   a) a control valve assembly including a control valve, an actuator, a positioner and means for supplying actuating energy to the positioner;
   b) a computer with an input and output card, the valve assembly being connected to the input and output card of the computer; and
   c) an executable program which, when executed simulates a process with disturbances, the executable program including a mathematical part of a simulation model of a process control loop, the model including a process variable, flow equations for the control valve and pipeline behavior features, a process controller and a process transmitter, the executable program being executed on the computer.

7. Equipment according to claim 6 wherein the actuator is a double acting actuator and the positioner is a two-stage electromagnetic positioner with an I/P conversion inside a position feedback loop.

* * * * *